United States Patent
Mizuno et al.

(10) Patent No.: US 10,788,461 B2
(45) Date of Patent: Sep. 29, 2020

(54) METHOD AND APPARATUS FOR MEASURING HYDROGEN-INDUCED CRACKING

(71) Applicant: JFE STEEL CORPORATION, Tokyo (JP)

(72) Inventors: Daisuke Mizuno, Tokyo (JP); Nobuyuki Ishikawa, Tokyo (JP); Yutaka Matsui, Tokyo (JP); Kyono Yasuda, Tokyo (JP); Koji Fujimoto, Tokyo (JP); Shigeaki Sugimoto, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 226 days.

(21) Appl. No.: 15/778,012

(22) PCT Filed: Nov. 22, 2016

(86) PCT No.: PCT/JP2016/084520
§ 371 (c)(1),
(2) Date: May 22, 2018

(87) PCT Pub. No.: WO2017/090572
PCT Pub. Date: Jun. 1, 2017

(65) Prior Publication Data
US 2018/0340913 A1 Nov. 29, 2018

(30) Foreign Application Priority Data

Nov. 27, 2015 (JP) .................. 2015-231276

(51) Int. Cl.
*G01N 29/265* (2006.01)
*G01N 29/28* (2006.01)
(Continued)

(52) U.S. Cl.
CPC ......... *G01N 29/265* (2013.01); *G01N 29/043* (2013.01); *G01N 29/0672* (2013.01);
(Continued)

(58) Field of Classification Search
CPC ............. G01N 29/043; G01N 29/0672; G01N 29/262; G01N 29/265; G01N 29/28;
(Continued)

(56) References Cited

U.S. PATENT DOCUMENTS 4,279,157 A * 7/1981 Schomberg ............ G01H 3/125
73/618
4,922,421 A * 5/1990 Tam .................... G01N 29/0618
378/901

(Continued)

FOREIGN PATENT DOCUMENTS

| CN | 101909230 A | 12/2010 |
| EP | 0616042 A1 | 9/1994 |

(Continued)

OTHER PUBLICATIONS

Korean Office Action for Korean Application No. 10-2018-7013975, dated Dec. 18, 2019, with Concise Statement of Relevance of Office Action, 6 pages.

(Continued)

*Primary Examiner* — Natalie Huls
(74) *Attorney, Agent, or Firm* — RatnerPrestia (57) ABSTRACT

There are proposed a method for measuring hydrogen-induced cracking which can measure hydrogen-induced cracking initiated in an interior of a test specimen during HIC test and a measuring apparatus used in this method. When cracks initiated in an interior of a test specimen 1 immersed in a test solution 5 containing hydrogen sulfide is measured by an ultrasonic probe 2 placed in a vessel 3, the position and size of cracks initiated in the interior of the test (Continued)

specimen 1 are measured with the lapse of time at a state of immersing the test specimen 1 in the test solution by scanning the ultrasonic probe 2 or the test specimen 1.

20 Claims, 8 Drawing Sheets (51) Int. Cl.
*G01N 29/04* (2006.01)
*G01N 29/26* (2006.01)
*G01N 29/06* (2006.01)
*G01N 29/27* (2006.01)

(52) U.S. Cl.
CPC ........... *G01N 29/262* (2013.01); *G01N 29/27* (2013.01); *G01N 29/28* (2013.01); *G01N 2291/0234* (2013.01); *G01N 2291/0289* (2013.01); *G01N 2291/2626* (2013.01)

(58) Field of Classification Search
CPC ... G01N 2291/0234; G01N 2291/0289; G01N 2291/2626
See application file for complete search history.

(56) References Cited

U.S. PATENT DOCUMENTS

| | | | |
|---|---|---|---|
| 5,555,916 A | 9/1996 | Kushida | |
| 5,728,943 A * | 3/1998 | Colter, Jr. | G01N 17/00 324/700 |
| 6,173,613 B1 * | 1/2001 | Dunegan | G01H 1/00 73/1.82 |
| 7,602,301 B1 * | 10/2009 | Stirling | A61B 5/1127 340/573.1 |
| 8,547,428 B1 * | 10/2013 | Olsson | G03B 37/005 348/374 |
| 2005/0007882 A1 * | 1/2005 | Bachelor | G10K 11/343 367/103 |
| 2014/0318252 A1 * | 10/2014 | Tomita | G01N 29/0672 73/625 |
| 2015/0133960 A1 * | 5/2015 | Lohmeier | A61B 50/30 606/130 |
| 2015/0279072 A1 * | 10/2015 | Black | G06T 11/60 382/109 |
| 2015/0301010 A1 * | 10/2015 | Valentini | G01N 33/2025 73/19.07 |
| 2017/0191969 A1 * | 7/2017 | Traidia | G01N 29/30 |
| 2018/0292357 A1 * | 10/2018 | Leach | G01N 29/069 |

FOREIGN PATENT DOCUMENTS

| | | | |
|---|---|---|---|
| FR | 2939510 | A1 | 6/2010 |
| JP | 63115750 | U | 7/1988 |
| JP | 04259853 | A | 9/1992 |
| JP | H06271976 | A | 9/1994 |
| JP | H10142208 | A | 5/1998 |
| JP | 2001232294 | A | 8/2001 |
| JP | 2002112395 | A | 4/2002 |
| JP | 2001041944 | A | 2/2016 |
| KR | 20030073813 | A | 9/2003 |
| KR | 20110001751 | U | 2/2011 |
| KR | 20140127755 | A | 11/2014 |

OTHER PUBLICATIONS

Extended European Search Report for European Application No. 16 868 519.6, dated Oct. 11, 2018, 9 pages.
International Search Report and Written Opinion for International Application No. PCT/JP2016/084520, dated Feb. 7, 2017, 4 pages.
NACE International, The Corrosion Society, "Standard Test Method: Evaluation of Pipeline and Pressure Vessel Steels for Resistance to Hydrogen-Induced Cracking", NACE Standard TM0284-2003, Item No. 21215, 2003, 15 pages.
Sawamura et al., "In Situ Observation of Hydrogen-Induced Cracking in Sour Environment", Proceedings of JSCE Materials and Environments, Apr. 11, 2012 with translation, 7 pages.
Kushida, T., et al., "Considerations of hydrogen embrittlement in iron and steel materials from viewpoints of hydrogen diffusion and hydrogen absorption behavior," Mar. 9, 1994, vol. 33, Section 7, pp. 932-939, The Japan Institute of Metals and Materials.
Japanese Office Action for Japanese Application No. 2017-552411, dated Jul. 4, 2018, with Concise Statement of Relevance of Office Action, 5 pages.
Korean Office Action for Korean Application No. 10-2018-7013975, dated Jun. 21, 2019, with Concise Statement of Relevance of Office Action, 7 pages.
European Examination Report for European Application No. 16868519.6, dated Apr. 7, 2020, 5 pages.
Chinese Office Action for Chinese Application No. 201680065209.3, dated Jun. 3, 2020, with translation, 18 pages.

* cited by examiner

| | Test time (hr) | Ultrasonic testing (C scanning) results | Crack area ratio CAR(%) |
|---|---|---|---|
| Results measured in test solution | 12 |  | 13.8 |
| | 24 |  | 27.4 |
| | 48 |  | 33.1 |
| | 96 |  | 36.0 |
| Result measured after taking out | 96 |  | 34.8 |

Fig. 10(a) Start time     Fig. 10(b) 12hr

METHOD AND APPARATUS FOR MEASURING HYDROGEN-INDUCED CRACKING

CROSS REFERENCE TO RELATED APPLICATIONS

This is the U.S. National Phase application of PCT/JP2016/084520, filed Nov. 22, 2016, which claims priority to Japanese Patent Application No. 2015-231276, filed Nov. 27, 2015, the disclosures of these applications being incorporated herein by reference in their entireties for all purposes.

TECHNICAL FIELD OF THE INVENTION

This invention relates to a method and an apparatus for measuring hydrogen-induced cracking, wherein an initiation and propagation of hydrogen-induced cracking in an interior of a steel material are measured in real time, and more particularly to a measuring method and a measuring apparatus, wherein an initiation and propagation of hydrogen-induced cracking (HIC: hydrogen-induced cracking, which may be also referred to as "HIC" hereinafter) being a problem when a welded steel pipe for a linepipe, a seamless steel pipe for an oil well or the like is immersed in an aqueous solution containing hydrogen sulfide are measured with an ultrasonic testing in real time.

BACKGROUND OF THE INVENTION

Recently, development of energy resources has run up to ultimate areas and hence a depth of an oil well or a gas well is increasing. As a result, hydrogen sulfide ($H_2S$) contained in crude oil or natural gas tends to be increased. In a corrosion environment containing hydrogen sulfide, it is known to promote permeation of hydrogen into steel. In pipes for oil well and gas well, pipelines for transporting petroleum or natural gas, oil refining facilities and so on, therefore, it is feared that hydrogen-induced cracking (HIC) is initiated, leading to an accident.

HIC is a phenomenon where atomic hydrogen generated in an inner face of a pipe by corrosion permeates into steel, diffuses therein and accumulates around a non-metallic inclusion or a second phase existing in steel to be gasified, causing cracking under an internal pressure. It is known that HIC is propagated along a hard region corresponding to a center segregation zone of steel or a band-like hard region formed by rolling. Especially, a tip portion of MnS extended by rolling is harmful to HIC because stress is easily concentrated.

In order to prevent the initiation of HIC, it is effective to properly adjust a chemical composition or production conditions of steel, control a morphology or a dispersion condition of inclusions and/or decrease center segregation, and hence steel plates or steel pipes for sour-resistant linepipes having an excellent HIC resistance are developed and put into practice.

As the steel plate for the sour-resistant linepipes are generally used ones of X65 grade (TS: not less than 535 MPa, YS: not less than 450 MPa) defined by a standard of American Petroleum Institute (API). Since high-pressure transportation is directed from a viewpoint of high transportation efficiency and reduction of laying cost, the steel plate for linepipes is required to have a higher strength. However, since HIC is closely related to a strength of a material, a crack sensitivity to HIC becomes higher, as the strength becomes higher, or a hardness is increased.

The HIC resistance of steel is generally evaluated by HIC test defined in a standard of NACE TM0284. This test is a method wherein a steel material (test specimen) of a given size is immersed in an aqueous solution containing not less than 2300 ppm of hydrogen sulfide for 96 hours and then the test specimen is taken out therefrom and cut to observe the cross-section and evaluate a crack length and a form of HIC initiated in the interior of the test specimen (see Non-patent Document 1). In recent years, in order to perform quantitative evaluation of cracking in the interior of the steel material more efficiently, the evaluation is conducted by a method that an area ratio of a cracked portion to a sectional area of the test specimen is calculated with an ultrasonic test equipment (UT) (see Patent Document 1).

In Patent Document 2 is proposed a method for measuring an initiation and propagation of HIC in real time by a combination of electrochemical hydrogen permeation method and an ultrasonic testing. In this method, the test specimen is attached between a cathode chamber and an anode chamber, hydrogen supplied from the cathode chamber and diffused through the test specimen is drawn out in the anode chamber, and then an electric current associated with anode reaction is measured to evaluate hydrogen permeation rate; at the same time, hydrogen-induced cracking in the interior of the test specimen is periodically measured by an ultrasonic probe immersed in a solution inside the anode chamber.

PRIOR ART DOCUMENTS

Patent Documents

Patent Document 1: JP-A-H04-259853
Patent Document 2: JU-A-S63-115750

Non-Patent Document

Non-patent Document 1: Standard Test Method, "Evaluation of Pipeline and Pressure Vessel Steels for Resistance to Hydrogen-Induced Cracking" TM0284-2003, NACE International (2003)

SUMMARY OF THE INVENTION

In the cross-section observation or ultrasonic testing of the test specimen after the immersion for 96 hours, which is a general evaluation method in the HIC test, the cracking condition initiated in the test specimen can be measured. However, the initiation and propagation of cracks on the way of the test cannot be measured in real time.

Also, when the test specimen taken out from the test solution containing hydrogen sulfide is exposed to air, a corrosion condition on the surface changes, so that when the test specimen is again immersed in the test solution to conduct the test, the corroded form and quantity are never the same as in the continuously performed test. Therefore, if a test specimen is once taken out, the test specimen cannot be used on a continuing basis. Namely, in order to measure the initiation and propagation of cracks in the HIC test in real time, it is necessary to measure the test specimen at a state of immersing in the solution containing hydrogen sulfide.

In the method disclosed in Patent Document 1, the cracks initiated in the vicinity of the surface of the test specimen by the HIC test can be measured in a high accuracy by a water-immersion type ultrasonic testing. However, since the measurement is not performed in the HIC test solution, the initiation and propagation of cracks during the HIC test cannot be measured continuously.

In the method disclosed in Patent Document 2, the initiation and propagation of HIC can be measured continuously at a state of exposing one face of the test specimen to the test solution. In this method, however, only one-side face of the specimen is permeated by hydrogen, which is different from the permeation state of hydrogen into the test specimen in the HIC test where all of six faces are exposed to the test solution.

In the measurement of the cracks in the test specimen with the ultrasonic probe, it is necessary to move the ultrasonic probe relatively to the test specimen or move the test specimen relatively to the ultrasonic probe. However, this point is not described in Patent Document 2.

Aspects of the invention are made in consideration of the problems inherent to the conventional techniques and is to propose a method for measuring hydrogen-induced cracking in which the initiation and propagation of hydrogen-induced cracking initiated in the interior of the steel material during the HIC test can be measured in real time and provide a measuring apparatus used in this method.

The inventors have focused on a method for measuring cracks without taking out a test specimen from a vessel in order to solve the above problem and made various studies. As a result, it has been found that when a test specimen (steel material) or an ultrasonic probe placed in a vessel for HIC test is periodically scanned in some way during the HIC test, the initiation and propagation of hydrogen-induced cracking initiated in the interior of the steel material can be measured in real time, and aspects of the invention have been accomplished.

That is, one aspect of the invention is a method for measuring hydrogen-induced cracking by immersing a test specimen in a test solution containing hydrogen sulfide inside a vessel and measuring cracks initiated in the interior of the test specimen with an ultrasonic probe, wherein the ultrasonic probe is placed in the vessel and the ultrasonic probe and test specimen are relatively scanned every given time to measure the position and size of cracks initiated in the interior of the test specimen with time at a state of immersing the test specimen in the test solution.

In the method for measuring hydrogen-induced cracking according to another aspect of the invention, the scanning is preferable to include a mechanical scanning of moving the ultrasonic probe relatively to the test specimen or moving the test specimen relatively to the ultrasonic probe.

In the method for measuring hydrogen-induced cracking according to another aspect of the invention, it is preferable that a measuring face of the test specimen (a face receiving an ultrasonic wave transmitted from the ultrasonic probe) is arranged approximately vertically in the test solution.

Also, one aspect of the invention is an apparatus for measuring hydrogen-induced cracking, which comprises a vessel for housing a test solution containing hydrogen sulfide and immersing a test specimen, an ultrasonic probe placed in the test solution for transmitting an ultrasonic wave toward the test specimen and receiving a reflection echo from the test specimen, a scanning means for relatively scanning the ultrasonic probe and the test specimen every given time, and a visualizing means for visualizing cracks in the interior of the test specimen based on a signal received from the ultrasonic probe every scanning position.

In the apparatus for measuring hydrogen-induced cracking according to another aspect of the invention, the scanning means is preferable to have a driving mechanism for moving the ultrasonic probe relatively to the test specimen or moving the test specimen relatively to the ultrasonic probe. In this case, the driving mechanism is preferable to comprise a driving shaft connected to the ultrasonic probe or the test specimen, a driving device placed outside the vessel, and a non-contact power-transmitting means for transmitting power of the driving device to the driving shaft at a distance from the vessel at a non-contact state.

In the apparatus for measuring hydrogen-induced cracking according to another aspect of the invention, it is preferable to be provided with a bubble-removing means for removing bubbles attached to a measuring face of the test specimen. For example, the bubble-removing means may be a brush fitted to the ultrasonic probe for utilizing a relative displacement between the ultrasonic probe and the test specimen by the driving mechanism to sweep a face of the test specimen irradiated with the ultrasonic wave.

In the apparatus for measuring hydrogen-induced cracking according to another aspect of the invention, the ultrasonic probe is preferable to be a linear phased array probe constructed by one-dimensionally arranging a plurality of vibrators for transmitting and receiving an ultrasonic wave so as to scan electronically in a direction perpendicular to a scanning direction through the driving mechanism.

In the apparatus for measuring hydrogen-induced cracking according to another aspect of the invention, the ultrasonic probe is preferable to be tightly sealed in a case having a corrosion resistance to the test solution.

In the apparatus for measuring hydrogen-induced cracking according to another aspect of the invention, the visualizing means is preferable to be constructed so as to obtain a plurality of ultrasonic tomographic images based on signals received from the ultrasonic probe every scanning position and synthesize the plurality of ultrasonic tomographic images to reconstruct a three-dimensionally ultrasonic image of cracking in the interior of the test specimen.

According to aspects of the invention, the initiation and propagation of hydrogen-induced cracking initiated in the interior of the test specimen immersed in the aqueous solution containing hydrogen sulfide can be measured in real time without taking out the test specimen from the test solution and in a detection accuracy equal to or more than that of the conventional method where ultrasonic testing is conducted after the test specimen is taken out. According to aspects of the invention, therefore, the HIC sensitivity of the test specimen (steel material) can be evaluated, so that it is possible to provide beneficial information in view of product's design.

BRIEF DESCRIPTION OF THE DRAWINGS

FIG. 3 shows an ultrasonic probe usable in the HIC apparatus of FIG. 2, wherein

FIGS. 10(a)-10(e) are views illustrating cracks in an interior of a test specimen measured by the HIC measuring method according to an embodiment of the invention three-dimensionally with t time.

DETAILED DESCRIPTION OF EMBODIMENTS OF THE INVENTION

Figure 1:
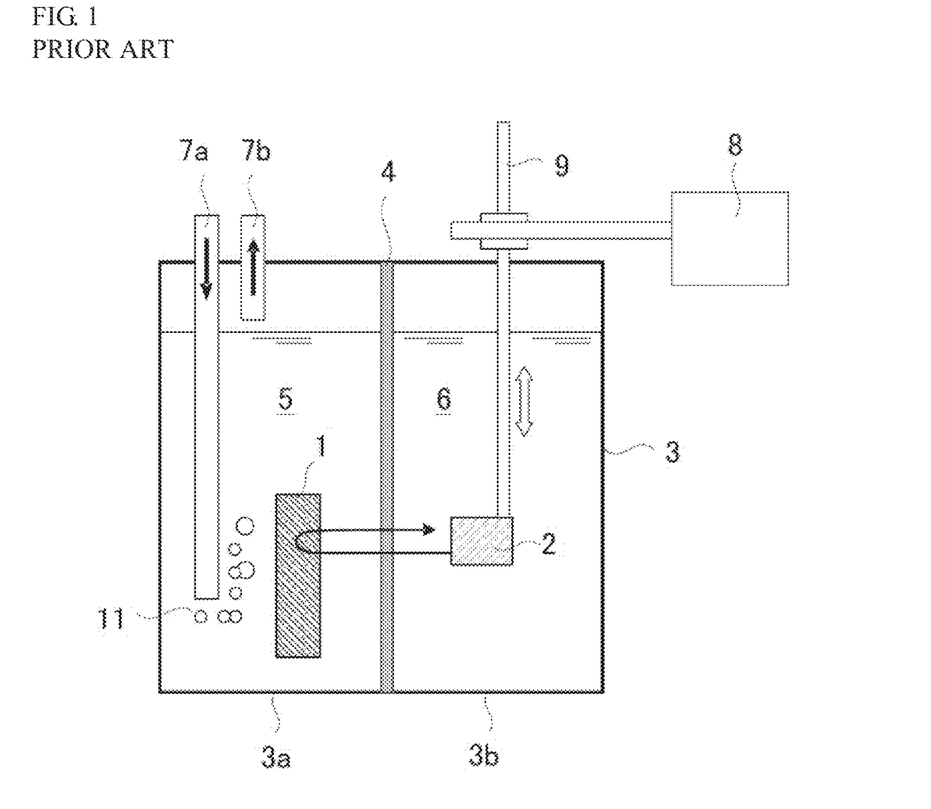
FIG. 1 is a schematic view illustrating HIC measuring apparatus of the prior art.

FIG. 1 shows HIC measuring apparatus of the prior art having a structure similar to the measuring apparatus disclosed in Patent Document 2.

In this HIC apparatus, a test specimen 1 measuring hydrogen-induced cracking (HIC) and an ultrasonic probe 2 measuring cracks initiated in the test specimen 1 (hereinafter also referred to as "probe" simply) are housed in a vessel 3, which is divided by a partition wall 4 disposed in a central portion of the vessel into a specimen chamber 3a setting the test specimen 1 and a probe chamber 3b setting the ultrasonic probe 2. In the specimen chamber 3a is charged a HIC test solution 5 in an amount immersing the test specimen 1, while water 6 is charged in the probe chamber 3b in an amount immersing the probe 2.

In the specimen chamber 3a, there are disposed an inlet 7a and a outlet 7b for introducing and exhausting a nitrogen gas for deaeration of the test solution 5 and hydrogen sulfide for dissolution into the test solution 5. Also, the probe 2 is constructed so as to scan the whole of the measuring face of the test specimen 1 by a driving device 8 disposed in an outside of the vessel 3 through a driving shaft 9 connected to the probe 2 for measuring cracks initiated in the interior of the test specimen 1.

Although the cracks initiated in the interior of the test specimen 1 can be measured at a state of immersing the test specimen 1 into the test solution 5, the measurement is performed through the partition wall 4 and hence ultrasonic wave is attenuated, so that this HIC measuring apparatus has a problem that the cracks cannot be measured in a high accuracy.

Aspects of the invention solve the above problem and develops an apparatus for measuring hydrogen-induced cracking (HIC) which is capable of measuring initiation and propagation of cracks inside the test specimen 1 in real time.

Figure 2:
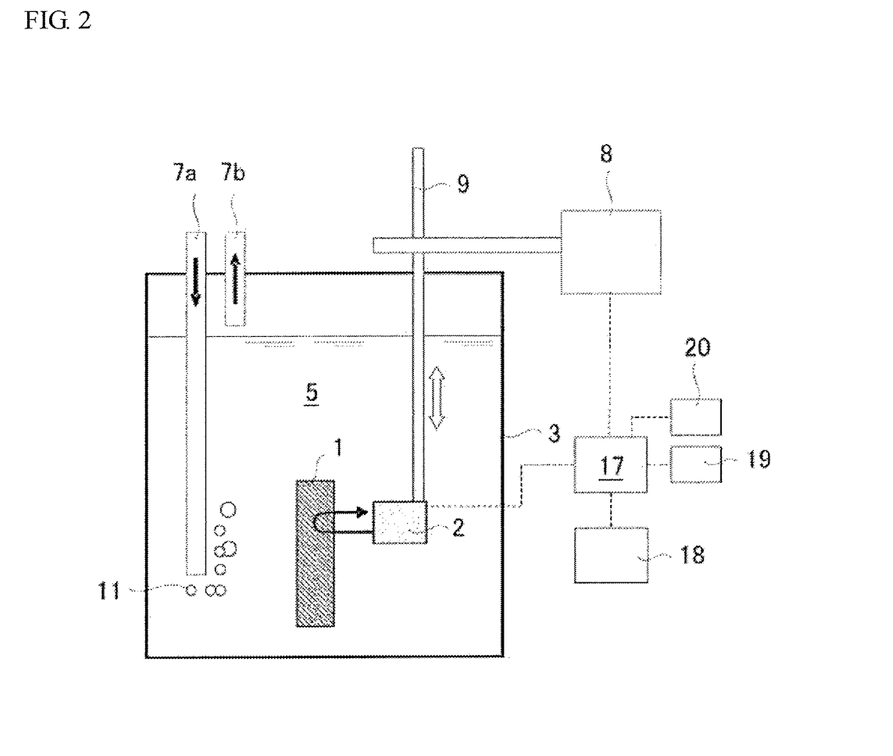
FIG. 2 is a schematic view illustrating HIC measuring apparatus according to an embodiment of the invention.

FIG. 2 shows an example of HIC measuring apparatus according to an embodiment of the invention. In this measuring apparatus, a test specimen 1 measuring hydrogen-induced cracking (HIC) and an ultrasonic probe 2 measuring cracks initiated in the test specimen 1 are disposed in an interior of a single test container (vessel) 3, and a test solution 5 is charged into the vessel 3 in an amount immersing the test specimen 1 and the probe 2.

In the vessel 3 are disposed an inlet 7a and an outlet 7b for introducing and exhausting a nitrogen gas for deaeration of the test solution 5 and hydrogen sulfide for dissolution into the test solution 5. The material of the vessel 3 is preferable to be glass, acryl or the like and should not be deteriorated by reacting with hydrogen sulfide or an aqueous solution containing hydrogen sulfide (test solution 5). Also, the vessel 3 has a structure not leaking hydrogen sulfide or a volatile matter thereof to exterior and having excellent liquid tightness and air tightness.

In this embodiment, for example, an ultrasonic probe corresponding to a frequency range of 1 MHz to 50 MHz can be used. It is desirable to select an optimum frequency in accordance with the form of the crack. Moreover, when carbon steel is used as the test specimen 1 and HIC is detected in an aqueous solution containing hydrogen sulfide, it is preferable to use a probe at a frequency of 5-15 MHz.

Also, the ultrasonic probe 2 may be comprised of a single vibrator. In order to measure cracks initiated in the test specimen with the single vibrator over the whole of the measuring face of the test specimen, however, it is necessary that the probe 2 is scanned over the measuring face of the test specimen in a widthwise direction and a length direction of the test specimen or the measuring face of the test specimen 1 is scanned over the probe 2 in a widthwise direction and a length direction of the test specimen 1, and hence a long time is required in the measurement.

In this embodiment, therefore, it is preferable to use a linear phased array probe 2 constructed by arranging a plurality of vibrators 2a one-dimensionally (see FIG. 3), or arranging them in the widthwise direction or the length direction of the test specimen 1. As the linear phased array probe 2, there are included a probe constructed by arranging plate-shaped vibrators 2a in one row, a probe constructed by aligning plate-shaped vibrators 2a on the tilt so as to form a curved form as a whole of the probe, a probe constructed by aligning vibrators 2a having a curvature in one row so as to have a curvature as a whole of the probe and so on. It is desirable to use an optimum linear phased array probe 2 in accordance with the form of the test specimen 1. While the linear phased array probe 2 is used, the vibrators 2a for transmitting and receiving an ultrasonic wave are switched over sequentially to perform electronic scanning, whereby a direction for mechanically scanning the probe 2 or the test specimen 1 can be made to one direction and hence the measuring time can be reduced to a large extent, and moreover, the driving mechanism conducting the mechanical scanning as mentioned later may be simplified. In this case, the electronic scanning direction of the linear phased array probe 2 is preferable to be a direction perpendicular to the mechanical scanning direction. In the illustrated example, the electronic scanning direction of the linear phased array probe 2 is a widthwise direction (lateral direction) of the test specimen 1, for the linear phased array probe 2 is scanned along a length direction (longitudinal direction) of the test specimen 1 by the driving mechanism.

In accordance with aspects of the invention, a matrix phased array probe constructed by arranging a plurality of vibrators in two directions of the widthwise direction and length direction of the test specimen 1 may be used as a probe 2. In the matrix phased array probe (not shown), there are also included a probe constructed by arranging vibrators having a curvature or plate-shaped vibrators so as to have a curvature as a whole of the probe and so on. It is desirable to use an optimum matrix phased array probe in accordance with the form of the test specimen 1. Since the measuring zone of the matrix phased array probe is wider than that of the linear phased array probe 2, the measuring time can be further reduced. Moreover, when the measuring zone of the matrix phased array probe 2 is made equal to or more than the measuring face of the test specimen 1, it is possible to further shorten the time required for the measurement.

Figure 3A:
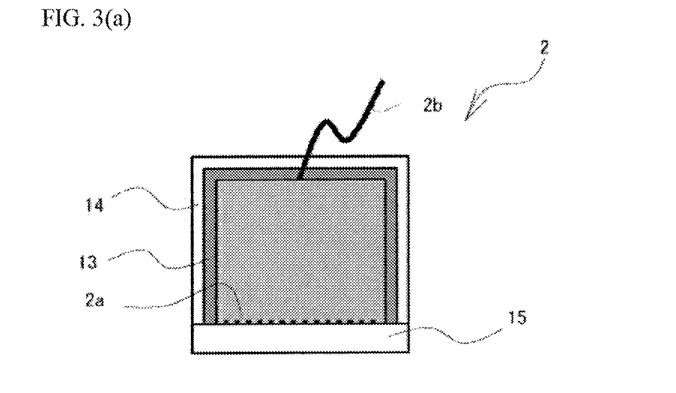
FIG. 3(a) is a section view taken along a widthwise direction of a test specimen and FIG. 3(b) is a section view taken along a length direction of the test specimen.
Figure 3B:
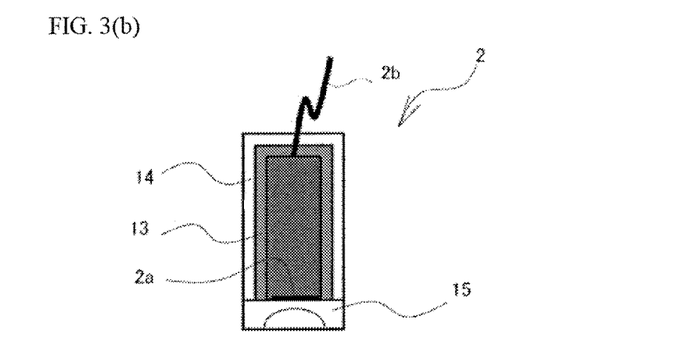

In this embodiment, in order to measure the cracks of the test specimen 1 during the HIC test, the ultrasonic probe 2 is immersed in the same test solution 5 containing hydrogen sulfide as the test specimen 1. When the ultrasonic probe 2 is made from a general material, there may be a case that the ultrasonic probe 2 is corroded in the test solution 5 containing hydrogen sulfide to make the transmission and receive of ultrasonic wave unstable. The usual ultrasonic probe has a structure that vibrators for transmitting and receiving ultrasonic wave, signal wires for connecting the vibrators to an electric circuit and a damper material for enlarging a bandwidth of the vibrators are enveloped in a case made of a stainless steel or the like. When the usual ultrasonic probe is immersed in the test solution containing hydrogen sulfide as it is, hydrogen sulfide or the like is permeated into the ultrasonic probe to deteriorate the vibrators or signal wires. When the ultrasonic probe is actually immersed in the test solution under the same environment as the HIC test by the inventors, the ultrasonic probe has lost the function of transmitting and receiving ultrasonic wave after about 24 hours. In this embodiment, therefore, the ultrasonic probe 2 has a structure capable of being tightly sealed in a case having a corrosion resistance to the test solution 5. Concretely, as shown in FIG. 3, a case 14 made from a resin or glass having a corrosion resistance to the test solution 5 is arranged at an outside of a case 13 made from common stainless steel or the like to form a double layer structure to thereby tightly seal and protect the probe 2. Each thickness of the inner case 13 and outer case 14 is preferable to be not less than 3 mm. Also, it is preferable that an acoustic lens 15 made from a glass or a resin material and constituting a part of the outer case 14 is disposed in a vibrator surface in the ultrasonic probe 2. In this connection, the sensitivity and resolution of ultrasonic testing can be increased and the structure of the ultrasonic probe 2 possessing the deterioration countermeasure can be formed. Furthermore, it is desirable that a cable portion 2b exposing from the outer case 14 is protected by a tube made from an acrylic resin or the like to form a structure preventing from corrosion by the test solution 5.

The driving mechanism of performing mechanical scanning by changing relative position between the probe 2 and the test specimen 1 will be described with reference to FIG. 2. The driving mechanism comprises a driving shaft 9 connected to the ultrasonic probe 2 or the test specimen 1, and a driving device 8 for driving the driving shaft 9 to raise and lower the ultrasonic probe 2 or the test specimen 1. In the illustrated example, the ultrasonic probe 2 is connected to the driving shaft 9 so as to raise and lower the ultrasonic probe 2 with respective to the test specimen 1.

When the driving device 8 scanning the ultrasonic probe 2 or the test specimen 1 is disposed in the vessel 3, it is required to take a corrosion countermeasure to hydrogen sulfide. In this embodiment, there is adopted a system wherein the driving device 8 is arranged outside the vessel 3 to scan the ultrasonic probe 2 or the test specimen 1 inside the vessel 3. Concretely, for example, a mechanical system wherein a revolution of the driving device 8 such as a motor arranged outside the vessel 3 is transmitted to the driving shaft 9 such as rack or the like through a pinion or the like to perform vertical or horizontal movement of the ultrasonic probe 2 or the test specimen 1 (rack-and-pinion mechanism). In a power transmission path from an output shaft of the driving device 8 to the driving shaft 9, there may be arranged a magnet coupling as a non-contact power transmission means for transmitting power of the driving device 8 to the driving shaft 9 in a non-contact state at a distance from the vessel 3. Concretely, there can be used a system of scanning the probe 2 or the test specimen 1 by arranging a pair of permanent magnets 10a, 10b inside and outside of the vessel 3 and rotating the outer permanent magnet 10b by the driving device 8 such as a motor or the like disposed outside of the vessel 3 to rotate the inner permanent magnet 10a inside the vessel 3 in a non-contact state (magnetic driving system).

Figure 4:
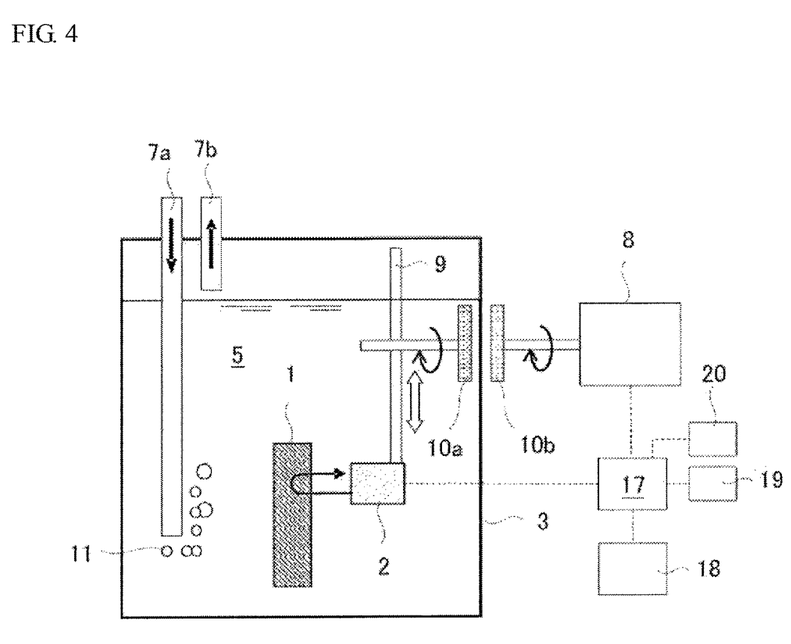
FIG. 4 is a schematic view illustrating HIC measuring apparatus according to another embodiment of the invention.

Moreover, when the driving device 8 and the probe 2 are physically connected through the driving shaft 9 as in the measuring apparatus shown in FIG. 1 or 2, in other words, when the aforementioned magnet coupling is not used, a through hole passing the driving shaft 9 or output shaft of the driving device 8 is arranged in the vessel 3, so that it is necessary to take a proper means preventing leakage of hydrogen sulfide. However, the magnetic driving type shown in FIG. 4 is advantageous in a point that the above attention is unnecessary.

The HIC measuring apparatus of the embodiment is provided with a visualizing means for visualizing cracks inside the test specimen 1 based on signals received from the ultrasonic probe 2 every scanning position. The visualizing means comprises an arithmetic control part 17 acquiring at least one of a scanning image A, a scanning image B and a scanning image C from reflection echo, scanning position and so on received by the probe 2, and a monitor 18 displaying the acquired scanning image(s). The arithmetic control part 17 may be constructed so as to synthesize a plurality of ultrasonic tomographic images (e.g. the scanning image B) obtained based on signals received from the probe 2 every scanning position to obtain a reconfigured three-dimensional ultrasonic image of cracks in the interior of the test specimen 1. The arithmetic control part 17 may be constructed so as to perform scanning control of the ultrasonic probe 2 and the driving mechanism. As the arithmetic control part 17, for example, there can be used a commercially available personal computer. Also, the HIC measuring apparatus may be provided with a memory part 19 storing the acquired images or the like, an input part 20 setting a time of repeated measurement (measurement period) or setting a target completion time of HIC test and so on.

There will be described the method for measuring hydrogen-induced cracking (HIC) according to an embodiment of the invention below.

The HIC test initiating the hydrogen-induced cracking is enough to be conducted according to a usual manner and is not particularly limited. For example, the test specimen 1 and the ultrasonic probe 2 are first placed in the vessel 3, and thereafter the test solution 5 is filled in the vessel 3 so as to completely immerse the test specimen 1 and the ultrasonic probe 2 therein. As the test solution 5, any test solution can be selected. There can be used, for example, a solution A defined in NACE TM0284 (5 mass % NaCl+0.5 mass % $CH_3COOH$), a BP solution (artificial seawater saturated with hydrogen sulfide, pH: 4.8-5.4) or the like.

Then, a nitrogen gas is blown into the test solution 5 at a flow rate of not less than 100 ml/min per 1 L of the test solution for at least 1 hour to deaerate oxygen dissolved in the test solution 5, and thereafter hydrogen sulfide ($H_2S$) gas is blown at a flow rate of not less than 200 ml/min per 1 L of the test solution for not less than 1 hour to dissolve $H_2S$ into the test solution 5. In the case of using 100% hydrogen sulfide gas, it is preferable that $H_2S$ concentration in the test solution 5 is measured after 1 hour to confirm that the concentration is not less than 2300 massppm (saturated state) before the start of the test. In the case of using a mixed gas of hydrogen sulfide and nitrogen or carbon dioxide, it is preferable that hydrogen sulfide concentration in the test solution 5 is confirmed to be a $H_2S$ concentration defined by 2300 mass×partial pressure of hydrogen sulfide before the start of the test. Here, the nitrogen gas and the hydrogen sulfide gas may be supplied from an inlet 7a in the same system or from another inlet in separate systems (not shown). An immersing time in the above HIC test solution 5 (test time) may be an arbitrary time but is 96 hours in HIC test of NACE TM0284.

The feature of the method for measuring hydrogen-induced cracking according to an embodiment of the invention lies in that cracks initiated in the interior of the test specimen 1 in the HIC test can be measured by ultrasonic testing in an arbitrary time from the start of the test to the end thereof at a state of immersing the test specimen 1 in the test solution 5. According to the HIC measuring method of this embodiment, cracks initiated in the interior of the HIC test specimen 1 can be measured in an arbitrary time during the test in real time by scanning the probe 2 or the test specimen 1 without taking out the test specimen 1 from the vessel 3. Also, the initiation and propagation of cracks initiated in the interior of the test specimen 1 can be measured by ultrasonic testing while scanning the ultrasonic probe 2 or the test specimen 1 at a constant time interval.

Figure 5:
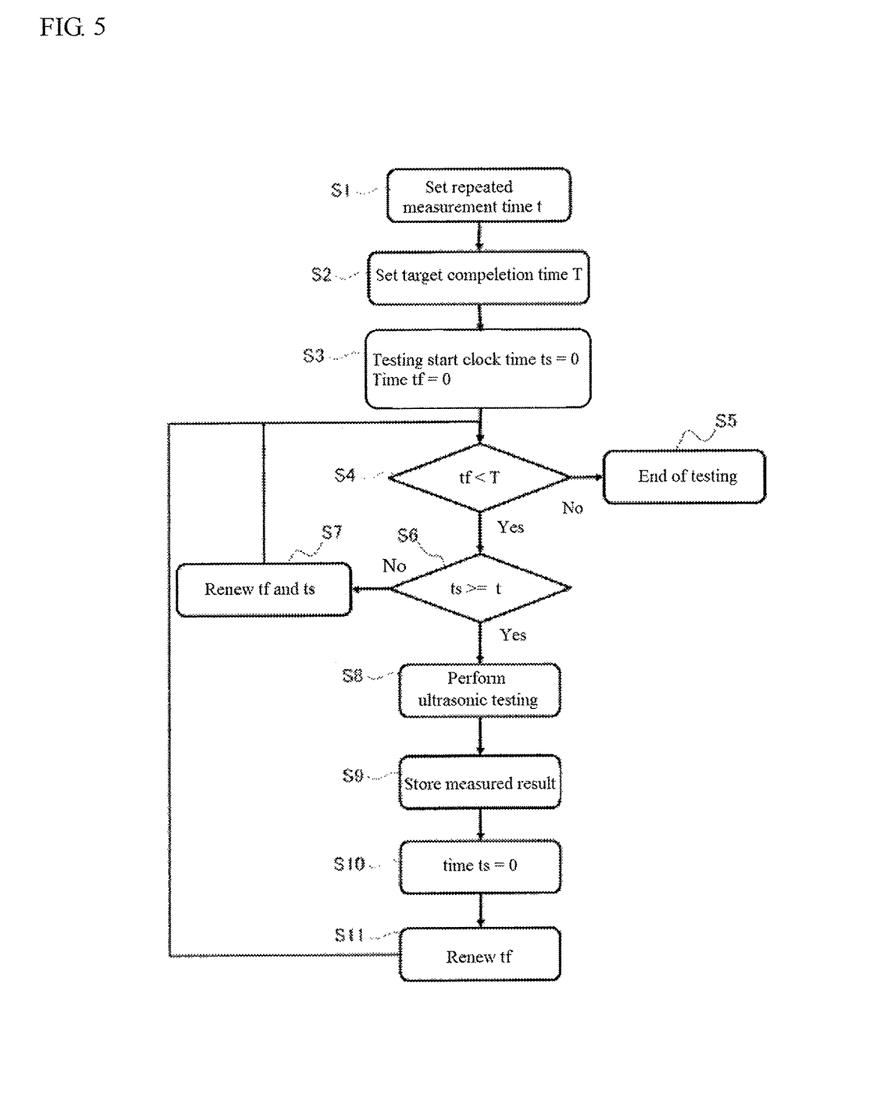
FIG. 5 is a flow chart explaining HIC measuring method according to an embodiment of the invention.

An example of the measuring method using the HIC measuring apparatus according to this embodiment is shown by a flow chart in FIG. 5. Firstly, a repeated measurement time t (measurement period) is set at a step S1, and a measurement target completion time T is set at a step S2. Then, an ultrasonic testing is started at a step S3. At a time of starting the ultrasonic testing, each of a clock time ts and a time tf elapsed from the start of the ultrasonic testing is 0. At a step S4, it is judged whether or not the elapsed time tf is less than the target completion time T. When the time arrives at the target completion time T, the ultrasonic testing is ended at a step S5. When the time is less than the target completion time T, whether or not the clock time ts arrives at the repeated measurement time t is judged at a step S6. When the time does not arrive at the repeated measurement time t, the time tf and the clock time ts are renewed at a step S7 and returned to the step S4. When the time arrives at the repeated measurement time t, the ultrasonic testing is performed at a step S8 and the measured results are stored at a step S9 and subsequently the clock time ts is reset to 0 at a step S10 and the time tf is renewed at a step S11, which are returned to the step S4.

When the corrosion of the steel material as a test specimen 1 is severe or when the test takes a long time, bubbles are attached to the surface of the test specimen 1 or the ultrasonic probe 2, and hence the measuring accuracy may become unstable. In order to avoid such a phenomenon, it is preferable to arrange the measuring face and the face of the ultrasonic probe 2 transmitting and receiving ultrasonic wave approximately vertically. By arranging them approximately vertically, the attachment of bubbles to the surface can be prevented and the measurement can be performed stably. The term "approximately vertically" means a gradient capable of preventing the attachment of bubbles to the surface and is not limited to a strictly vertical position. Therefore, there is no problem as long as an inclination angle to the vertical position is within 5 degree, and the angle within 3 degree is more preferable.

Figure 6:
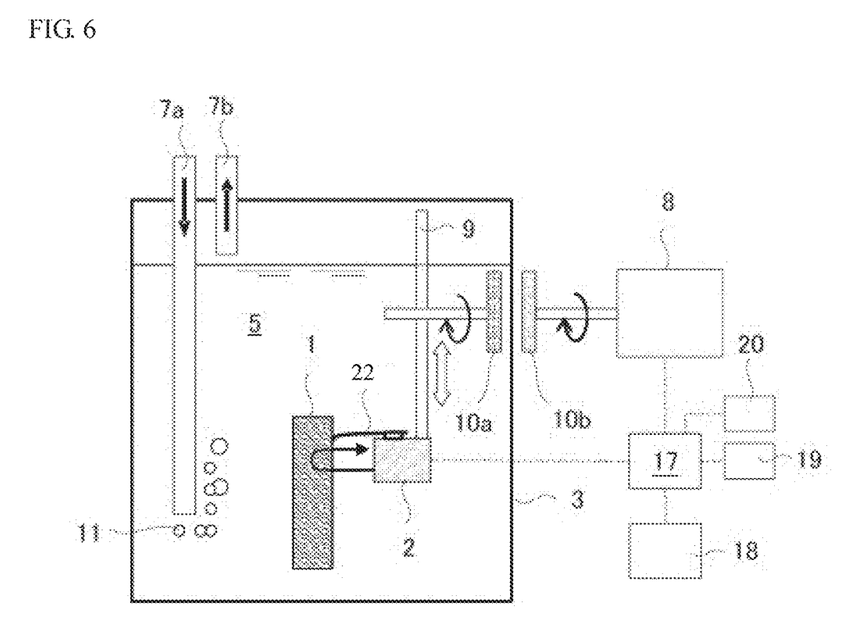
FIG. 6 is a schematic view illustrating HIC measuring apparatus according to the other embodiment of the invention.
Figure 7:
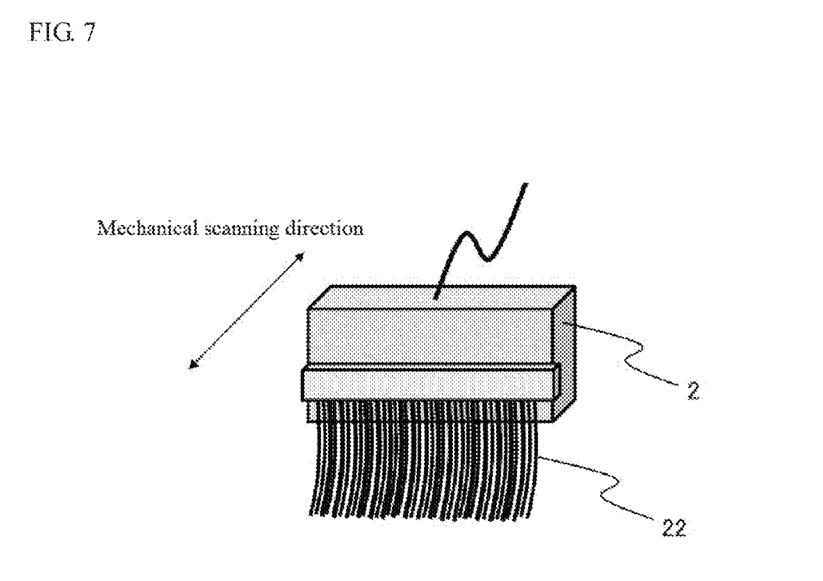
FIG. 7 is a schematic view of a brush in the apparatus of FIG. 6.

Nevertheless, the attachment of bubbles may still be caused, and therefore it is preferable that, as shown in FIGS. 6 and 7, a brush 22 is fitted to the ultrasonic probe 2 as a bubble removing means and the measuring face of the test specimen 1 is swept by utilizing relative displacement between the ultrasonic probe 2 and the test specimen 1 through the driving mechanism to perform the removal of bubbles attached to the surface of the test specimen 1. For the brush 22, it is preferable to use a material having a corrosion resistance to the test solution 5, and, for example, silicone rubber or a resin material can be used. In the illustrated example, the brush 22 is fitted to an upper portion of the probe 2, but the fitting position and fitting method of the brush are not limited to this example. As the bubble removing means, an injection nozzle is fitted to the probe 2 instead of the brush 22 in which bubbles may be removed by causing impingement of the test solution 5 or the like on the measuring face of the test specimen 1 from the injection nozzle.

Figure 8:
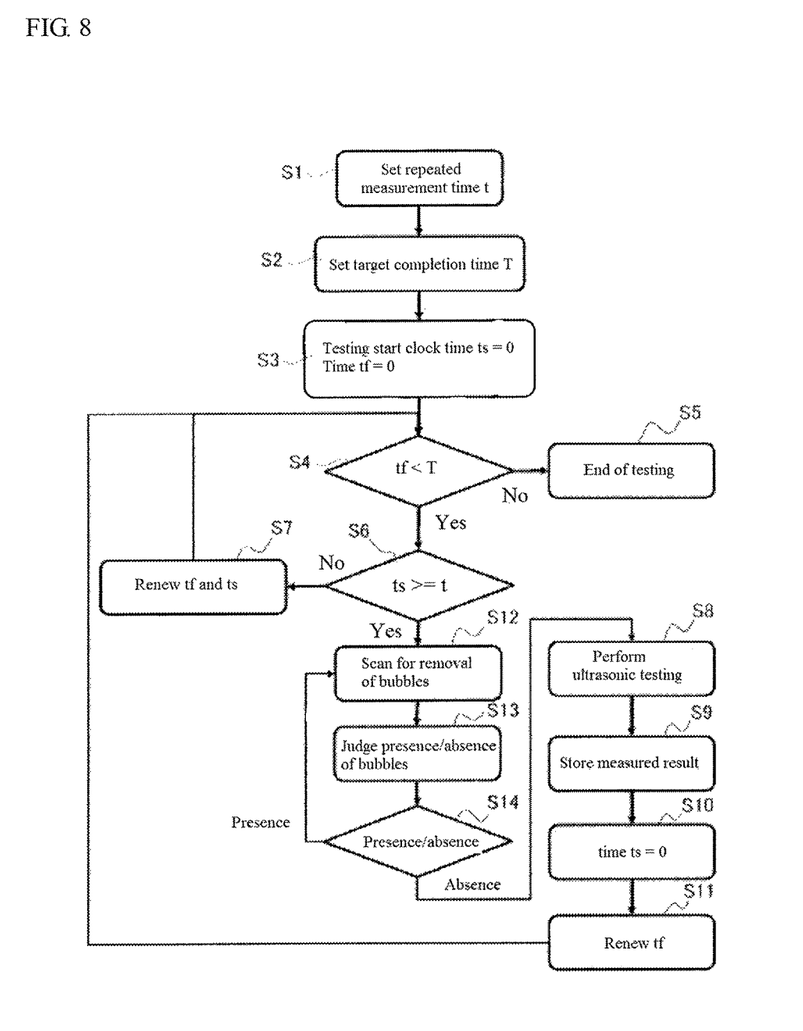
FIG. 8 is a flow chart explaining HIC measuring method according to another embodiment of the invention, which can be conducted with the apparatus of FIG. 6.

As shown, for example, by a flow chart in FIG. 8, the removal of bubbles with the brush or the like can be conducted by adding steps S12, S13 and S14 between the step S7 and the step S8 in the measuring method shown in FIG. 5. Concretely, the measuring face of the test specimen 1 is swept with the brush 22 by mechanically scanning the test specimen 1 or the ultrasonic probe 2 through the driving mechanism at the step S12 just before the measurement at the step S8, and the presence or absence of bubbles on the measuring face of the test specimen 1 is judged with a judging means on presence or absence of bubbles at the subsequent step S13. When the presence of bubbles is confirmed at the step S14, the scanning for the removal of bubbles is again performed back at the step S12. When the absence of bubbles is confirmed on the measuring face of the test specimen 1, the ultrasonic testing is performed at the step S8. Moreover, the judgement on the presence or absence of bubbles in the step S13 can be performed by transmitting and receiving ultrasonic wave with the ultrasonic probe 2 to obtain reflection wave from the surface of the test specimen 1 and judging from a propagation time thereof. That is, if bubbles exist, the receiving time of the ultrasonic wave is made earlier by a thickness of the bubbles, so that the presence or absence of the bubbles can be judged by monitoring a reflection wave from the surface with the lapse of time. Therefore, the ultrasonic probe 2 and the arithmetic control part 17 constitute the above judging means on presence or absence of bubbles. Adding the steps S12-S14 for the judgement on presence or absence of bubbles and the removal of bubbles can surely remove bubbles from the measuring face of the test specimen 1 to perform the measurement in a high accuracy.

Example 1

A test specimen having a length of 100 mm, a width of 20 mm and a thickness of 25 mm is taken out from an (API 5L) X65-grade linepipe steel for non-sour application (yield stress class of 65 ksi) having a chemical composition comprising C: 0.04-0.05 mass %, Si: 0.16-0.22 mass %, Mn: 1.40-1.50 mass %, P: less than 0.005 mass %, S: less than 0.002 mass %, Ni: 0.10-0.20 mass %, Cr: 0.18-0.22 mass %, Nb: 0.02-0.03 mass %, Ti: 0.008-0.012 mass % and the remainder being substantially Fe.

Then, the test specimen and an ultrasonic probe are arranged in a vessel of a HIC measuring apparatus according to the embodiment shown in FIG. 2 so that an ultrasonic testing face of the probe and a measuring face of the test specimen are parallel to each other and respectively vertical, and thereafter a NACE solution A (5 mass % NaCl+0.5 mass % $CH_3COOH$) is filled therein as a test solution to immerse the probe and the test specimen in the test solution.

Next, dissolved oxygen is purged by blowing a nitrogen gas at a flow rate of not less than 100 ml/min per 1 L of the test solution for 1 hour, and 100% $H_2S$ gas is blown into the solution at a flow rate of not less than 200 ml/min per 1 L of the test solution for 1 hour. After $H_2S$ concentration in the test solution is confirmed to be not less than 2300 ppm (saturated concentration), a HIC test is started according to HIC test of NACE TM0284. Moreover, pH of the test solution at the start of the test is 2.8.

In the HIC test, the ultrasonic probe is scanned along a length direction of the test specimen at an interval of 12 hours from the start of the test to the end of the test (96 hours later) to measure the initiation and propagation of cracks initiated in the interior of the test specimen in real time.

Here, the ultrasonic probe used in the above measurement is a linear phased array probe constructed by arranging 8 vibrators in the widthwise direction of the test specimen, and a measuring frequency thereof is 10 MHz.

In addition, 96 hours later, the final ultrasonic testing is performed in the test solution by the above method, and then nitrogen is promptly blown into the test solution at a flow rate of not less than 200 ml/min for 2 hours to purge $H_2S$ in the test solution. Thereafter, the test specimen is taken out from the test solution and immersed in water to measure a crack area ratio, or CAR in the interior of the test specimen with an ultrasonic probe of 10 MHz.

Figure 9:
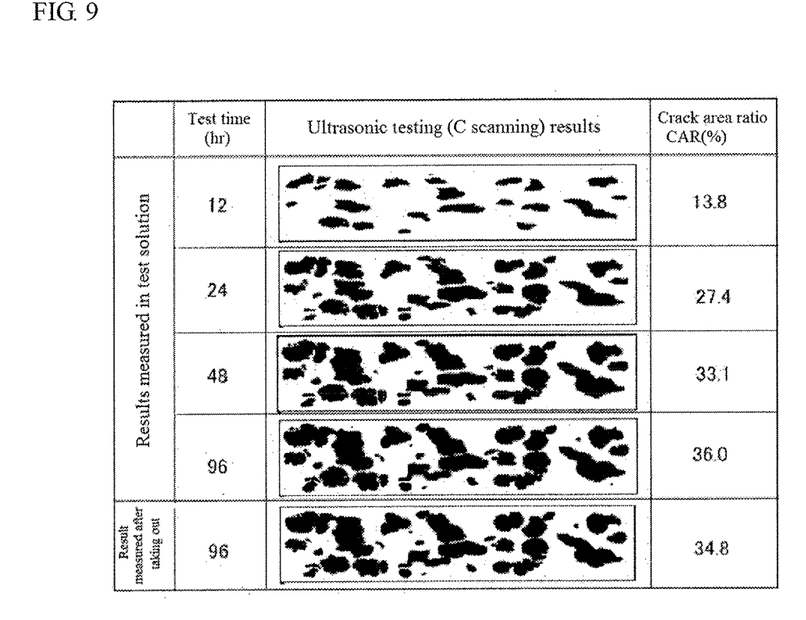
FIG. 9 is a view showing results obtained by measuring cracks initiated in an interior of a test specimen with time by the HIC measuring method according to an embodiment of the invention.

FIG. 9 shows initiation and propagation states of cracks in the interior of the test specimen with the lapse of HIC test time by C scanning images. As seen in this figure, the number of cracks initiated in the interior of the test specimen and crack area ratio (CAR) increased with the lapse of the test time. Therefore, it can be seen that the initiation and propagation of cracks initiated in the interior of the test specimen can be measured in real time by performing the crack measurement with the measuring apparatus according to aspects of the invention.

FIG. 9 shows a result obtained by taking out the test specimen from the test solution after the 96-hour test and again performing ultrasonic testing in water to measure cracks in the interior of the test specimen similarly in the prior art in addition to the above measured results. The difference of the measured results between both the methods is about 3.4% and is said to be approximately coincident with each other. According to aspects of the invention, therefore, the initiation and propagation of cracks in the test specimen inside the test solution containing hydrogen sulfide can be measured in real time in an accuracy equal to that of the prior art without taking out the test specimen from the test solution.

Figure 10A:
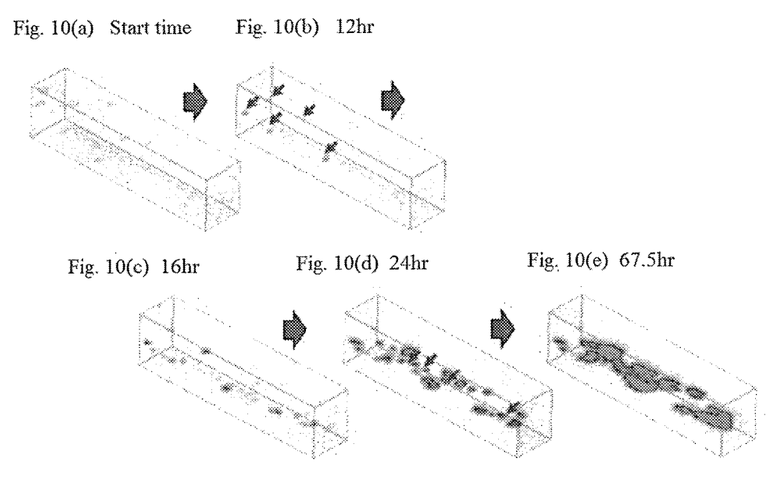

FIG. 10 shows three-dimensionally the initiation and propagation of cracks initiated in an interior of another test specimen having the same chemical composition when HIC test is performed under the same conditions as mentioned above. Concretely, the arithmetic control part as a visualizing means calculates a depth of defect from a propagation time of a reflection signal of an ultrasonic wave, and a three-dimensional distribution of defects in the interior of the test specimen is reconstructed from a measuring position of signal received (scanning position) and the depth of defect, and propagation of such a defect is displayed with the lapse of time. In this regard, FIG. 10(a) is a state at the start of the test, FIG. 10(b) is a state after 12 hours, FIG. 10(c) is a state after 16 hours, FIG. 10(d) is a state after 24 hours, and FIG. 10(e) is a state after 67.5 hours. By displaying the defect distribution three-dimensionally and with the lapse of time, the propagation of defects in the interior of the test specimen can be observed in more detail.

Example 2

A test specimen having a length of 100 mm, a width of 20 mm and a thickness of 25 mm is taken out from each of (API 5L) X65-grade linepipe steels A-C for non-sour application having different sensitivity to HIC and a chemical composition shown in Table 1 and subjected to the following HIC test to measure cracks.

The HIC test is performed by placing a test specimen and an ultrasonic probe in a vessel of a HIC measuring apparatus and filling a NACE solution A (5 mass % NaCl+0.5 mass % $CH_3COOH$) as a test solution to immerse the test specimen and the ultrasonic probe therein. In each case, they are arranged in the vessel so that a measuring face of the test specimen and a detecting face of the probe are parallel to each other and respectively vertical.

Then, nitrogen is blown into the test solution at a flow rate of not less than 100 ml/min per 1 L of the solution for 1 hour to purge dissolved oxygen, and 100% $H_2S$ gas is blown into the test solution at a flow rate of not less than 200 ml/min per 1 L of the solution. After $H_2S$ concentration in the test solution is confirmed to be not less than 2300 ppm (saturated state) after 1 hour, HIC test is started. Moreover, pH of the test solution at the start of the test is 2.9.

In addition, 96 hours later, ultrasonic testing is performed at a state of immersing the test specimen in the test solution to measure a crack area ratio CAR initiated in the interior of the test specimen.

Furthermore, nitrogen is promptly blown into the test solution at a flow rate of not less than 200 ml/min per 1 L of the test solution for 2 hours to purge $H_2S$ in the test solution after the above measurement, and then the test specimen is taken out from the test solution and immersed in water to measure a crack area ratio CAR in the interior of the test specimen with an ultrasonic probe of 10 MHz, and the measured value is used as a standard CAR for evaluating CAR according to aspects of the invention.

Here, the following three kinds of measuring apparatuses are used in the above HIC test.

<Measuring Apparatus a>

This apparatus is the measuring apparatus shown in FIG. 2 used in Example 1, wherein the test specimen and the ultrasonic probe are placed in the single vessel and the ultrasonic probe is mechanically scanned over the measuring face of the test specimen in the test solution to measure initiation and propagation of cracks.

<Measuring Apparatus b>

This apparatus is a measuring apparatus shown in FIG. 4, wherein the scanning of the ultrasonic probe in the measuring apparatus of FIG. 2 is conducted by using a magnetic force of a permanent magnet.

<Measuring Apparatus c>

This apparatus is the measuring apparatus of the prior art shown in FIG. 1, wherein the test specimen and the ultrasonic probe are arranged in the respective chamber separated each other in the vessel and the ultrasonic probe is mechanically scanned over the measuring face of the test specimen to measure initiation and propagation of cracks.

<Measuring Apparatus d>

This apparatus is a measuring apparatus shown in FIG. 6, wherein a brush is fitted to the ultrasonic probe in the measuring apparatus shown in FIG. 4 and the ultrasonic probe is scanned over the measuring face of the test specimen according to the flow chart shown in FIG. 8 to measure initiation and propagation of cracks.

Also, the following three kinds of ultrasonic probes are used in the above measurement of cracks.

<Probe a>

This is a probe constituted by a single vibrator having a measuring frequency of 10 MHz. In measurement of cracks of the test specimen with this probe, it is necessary to mechanically scan the probe or the test specimen in the widthwise direction and the length direction of the test specimen.

<Probe b>

This is a linear phased array probe constructed by arranging 64 vibrators having a measuring frequency of 10 MHz in the widthwise direction of the test specimen. In this probe, it is necessary to mechanically scan the probe or the test specimen in the length direction of the test specimen in order to measure cracks of the test specimen.

<Probe c>

This is a matrix phased array probe constructed by arranging 8 vibrators having a measuring frequency of 10 MHz in the widthwise direction of the test specimen and 64 vibrators having a measuring frequency of 10 MHz in the length direction thereof (512 vibrators in total). In this probe, it is possible to measure cracks of the test specimen without mechanically scanning the probe or the test specimen.

Table 2 shows the above measuring conditions and measurement results. It can be seen from the table that the crack area ratio CAR is within ±10% to the standard CAR, irrespectively of the kind of the probe and the driving system for scanning, in the examples performing the measurement with the measuring method and measuring apparatus according to aspects of the invention, in other words, in the examples for measuring cracks initiated in the test specimen at a state of immersing the ultrasonic probe in the test solution.

On the contrary, in the examples performing the measurement with the measuring method and measuring apparatus of the prior art, in other words, the examples measuring the crack area ratio in the test specimen by arranging the test specimen and the probe in each chamber, the difference between crack area ratio CAR and the standard CAR exceeds 10%.

According to the above examples of the present invention, therefore, hydrogen-induced cracking can be measured even in the test solution containing hydrogen sulfide or even for the test specimens having a different HIC sensitivity in an accuracy equal to that in the conventional measuring method of taking out the test specimen from the test solution and performing the measurement with ultrasonic wave.

TABLE 1

| | Chemical composition (mass %) | | | | | | | | | | | |
|---|---|---|---|---|---|---|---|---|---|---|---|---|
| Symbol of steel | C | Si | Mn | P | S | Al | Mo | Ni | Cr | Nb | Ti | N | Fe |
| A | 0.045 | 0.25 | 1.45 | <0.005 | <0.001 | 0.030 | 0.11 | 0.01 | 0.20 | 0.029 | 0.008 | 0.0030 | bal. |
| B | 0.048 | 0.30 | 1.43 | <0.005 | <0.001 | 0.028 | 0.00 | 0.11 | 0.25 | 0.030 | 0.010 | 0.0028 | bal. |
| C | 0.044 | 0.21 | 1.53 | <0.005 | <0.001 | 0.031 | 0.00 | 0.15 | 0.28 | 0.030 | 0.008 | 0.0020 | bal. |

TABLE 2

| | | | | | | CAR after 96 hours | | | | |
|---|---|---|---|---|---|---|---|---|---|---|
| No. | Test specimen | Measuring apparatus | Kind of probe | Scan measuring method | Power transmission system in scanning measurement | CAR (%) | Standard CAR (%) | CAR ratio *1 | Evaluation of measuring accuracy *2 | Remarks |
| 1 | A | FIG. 2 | linear phased array probe | mechanical + electronic | mechanical | 41.4 | 45.2 | 0.92 | ○ | Invention Example |
| 2 | B | FIG. 2 | linear phased array probe | mechanical + electronic | mechanical | 10.6 | 11.4 | 0.93 | ○ | Invention Example |
| 3 | C | FIG. 2 | linear phased array probe | mechanical + electronic | mechanical | 26.5 | 26.0 | 1.02 | ○ | Invention Example |
| 4 | B | FIG. 2 | matrix phased array probe | electronic | none | 11.5 | 12.2 | 0.94 | ○ | Invention Example |
| 5 | B | FIG. 2 | single probe | mechanical | mechanical | 14.8 | 15.6 | 0.95 | ○ | Invention Example |
| 6 | B | FIG. 4 | linear phased array probe | mechanical + electronic | magnetic driving | 15.0 | 16.1 | 0.93 | ○ | Invention Example |
| 7 | B | FIG. 6 | matrix phased array probe | mechanical + electronic | magnetic driving | 15.7 | 16.2 | 0.97 | ○ | Invention Example |
| 8 | B | FIG. 1 | single probe | mechanical | mechanical | 12.2 | 14.4 | 0.85 | x | Comparative Example |
| 9 | B | FIG. 1 | matrix phased array probe | electronic | none | 9.4 | 14.8 | 0.64 | x | Comparative Example |
| 10 | A | FIG. 1 | linear phased array probe | mechanical + electronic | mechanical | 22.6 | 31.4 | 0.72 | x | Comparative Example |
| 11 | B | FIG. 1 | linear phased array probe | mechanical + electronic | mechanical | 12.6 | 15.4 | 0.82 | x | Comparative Example |
| 12 | C | FIG. 1 | linear phased array probe | mechanical + electronic | mechanical | 18.4 | 24.3 | 0.76 | x | Comparative Example |

*1: CAR ratio = (CAR after 96 hours measured in test solution/standard CAR)
*2: Evaluation of measuring accuracy = CAR ratio within 1.0 ± 0.1 is evaluated by ○ and CAR ratio of more than 1.0 ± 0.1 is evaluated by x

INDUSTRIAL APPLICABILITY

According to aspects of the invention, cracks initiated in the interior of the test specimen can be measured in real time in the test solution without taking out the test specimen from the test solution and in a higher accuracy. Thus, it is very effective for evaluation on test specimens having a different HIC sensitivity. Moreover, aspects of the invention can be applied to not only steel materials such as steel plates for linepipes, seamless steel pipes and welded steel pipes but also materials capable of obtaining reflection echo from cracks inside the test specimen immersed in the test solution by ultrasonic testing.

DESCRIPTION OF REFERENCE SYMBOLS

1: test specimen
2: ultrasonic probe
2$a$: vibrator
2$b$: cable
3: test container (vessel)
3$a$: test specimen chamber
3$b$: probe chamber
4: partition wall
5: HIC test solution containing hydrogen sulfide
6: water
7$a$: inlet for hydrogen sulfide gas (nitrogen gas)
7$b$: outlet for hydrogen sulfide gas (nitrogen gas)
8: driving device
9: driving shaft
10$a$: permanent magnet (inner)
10$b$: permanent magnet (outer)
11: hydrogen sulfide gas (nitrogen gas)
13: case for inner layer
14: case for outer layer
17: arithmetic control part
18: monitor
19: memory part
20: input part

The invention claimed is:

1. An apparatus for measuring hydrogen-induced cracking, which comprises a vessel for housing a test solution containing hydrogen sulfide and immersing a test specimen, an ultrasonic probe placed in the test solution and immersed in the same test solution as the test specimen for transmitting an ultrasonic wave toward the test specimen and receiving a reflection echo from the test specimen, a scanning means for relatively scanning the ultrasonic probe and the test specimen every given time, and a visualizing means for visualizing cracks in the interior of the test specimen based on a signal received from the ultrasonic probe every scanning position.

2. The apparatus for measuring hydrogen-induced cracking according to claim 1, wherein the scanning means has a driving mechanism for moving the ultrasonic probe relatively to the test specimen or moving the test specimen relatively to the ultrasonic probe.

3. The apparatus for measuring hydrogen-induced cracking according to claim 2, wherein the driving mechanism comprises a driving shaft connected to the ultrasonic probe or the test specimen, a driving device placed outside the vessel, and a non-contact power-transmitting means for transmitting power of the driving device to the driving shaft at a distance from the vessel at a non-contact state.

4. The apparatus for measuring hydrogen-induced cracking according to claim 3, wherein the visualizing means is constructed so as to obtain a plurality of ultrasonic tomographic images based on signals received from the ultrasonic probe every scanning position and synthesize the plurality of ultrasonic tomographic images to reconstruct a three-dimensional ultrasonic image of cracking in the interior of the test specimen.

5. The apparatus for measuring hydrogen-induced cracking according to claim 2, which is provided with a bubble-removing means for removing bubbles attached to a measuring face of the test specimen.

6. The apparatus for measuring hydrogen-induced cracking according to claim 5, wherein the bubble-removing means is a brush fitted to the ultrasonic probe for utilizing a relative displacement between the ultrasonic probe and the test specimen by the driving mechanism to sweep a face of the test specimen irradiated with the ultrasonic wave.

7. The apparatus for measuring hydrogen-induced cracking according to claim 6, wherein the visualizing means is constructed so as to obtain a plurality of ultrasonic tomographic images based on signals received from the ultrasonic probe every scanning position and synthesize the plurality of ultrasonic tomographic images to reconstruct a three-dimensional ultrasonic image of cracking in the interior of the test specimen.

8. The apparatus for measuring hydrogen-induced cracking according to claim 5, wherein the visualizing means is constructed so as to obtain a plurality of ultrasonic tomographic images based on signals received from the ultrasonic probe every scanning position and synthesize the plurality of ultrasonic tomographic images to reconstruct a three-dimensional ultrasonic image of cracking in the interior of the test specimen.

9. The apparatus for measuring hydrogen-induced cracking according to claim 2, wherein the ultrasonic probe is a linear phased array probe constructed by one-dimensionally arranging a plurality of vibrators for transmitting and receiving an ultrasonic wave so as to scan electronically in a direction perpendicular to a scanning direction through the driving mechanism.

10. The apparatus for measuring hydrogen-induced cracking according to claim 9, wherein the visualizing means is constructed so as to obtain a plurality of ultrasonic tomographic images based on signals received from the ultrasonic probe every scanning position and synthesize the plurality of ultrasonic tomographic images to reconstruct a three-dimensional ultrasonic image of cracking in the interior of the test specimen.

11. The apparatus for measuring hydrogen-induced cracking according to claim 2, wherein the ultrasonic probe is tightly sealed in a case having a corrosion resistance to the test solution.

12. The apparatus for measuring hydrogen-induced cracking according to claim 11, wherein the visualizing means is constructed so as to obtain a plurality of ultrasonic tomographic images based on signals received from the ultrasonic probe every scanning position and synthesize the plurality of ultrasonic tomographic images to reconstruct a three-dimensional ultrasonic image of cracking in the interior of the test specimen.

13. The apparatus for measuring hydrogen-induced cracking according to claim 2, wherein the visualizing means is constructed so as to obtain a plurality of ultrasonic tomographic images based on signals received from the ultrasonic probe every scanning position and synthesize the plurality of ultrasonic tomographic images to reconstruct a three-dimensional ultrasonic image of cracking in the interior of the test specimen.

14. The apparatus for measuring hydrogen-induced cracking according to claim 1, wherein the ultrasonic probe is tightly sealed in a case having a corrosion resistance to the test solution.

15. The apparatus for measuring hydrogen-induced cracking according to claim 14, wherein the visualizing means is constructed so as to obtain a plurality of ultrasonic tomographic images based on signals received from the ultrasonic probe every scanning position and synthesize the plurality of ultrasonic tomographic images to reconstruct a three-dimensional ultrasonic image of cracking in the interior of the test specimen.

16. The apparatus for measuring hydrogen-induced cracking according to claim 1, wherein the visualizing means is constructed so as to obtain a plurality of ultrasonic tomographic images based on signals received from the ultrasonic probe every scanning position and synthesize the plurality of ultrasonic tomographic images to reconstruct a three-dimensional ultrasonic image of cracking in the interior of the test specimen.

17. A method for measuring hydrogen-induced cracking, the method comprising
    immersing a test specimen in a test solution containing hydrogen sulfide inside a vessel; and
    measuring cracks initiated in the interior of the test specimen with an ultrasonic probe, wherein the ultrasonic probe is placed in the vessel and immersed in the same test solution as the test specimen and the test specimen and the ultrasonic probe are relatively scanned every given time to measure a position and size of the cracks initiated in the interior of the test specimen with time at a state of immersing the test specimen in the test solution.

18. The method for measuring hydrogen-induced cracking according to claim 17, wherein the scanning includes a mechanical scanning of moving the ultrasonic probe relatively to the test specimen or moving the test specimen relatively to the ultrasonic probe.

19. The method for measuring hydrogen-induced cracking according to claim 18, wherein a measuring face of the test specimen is arranged approximately vertically in the test solution.

20. The method for measuring hydrogen-induced cracking according to claim 17, wherein a measuring face of the test specimen is arranged approximately vertically in the test solution.

* * * * *